Dec. 13, 1966   E. A. TURNER   3,290,819
FLORAL MOUNTING MEMBER
Filed May 14, 1965
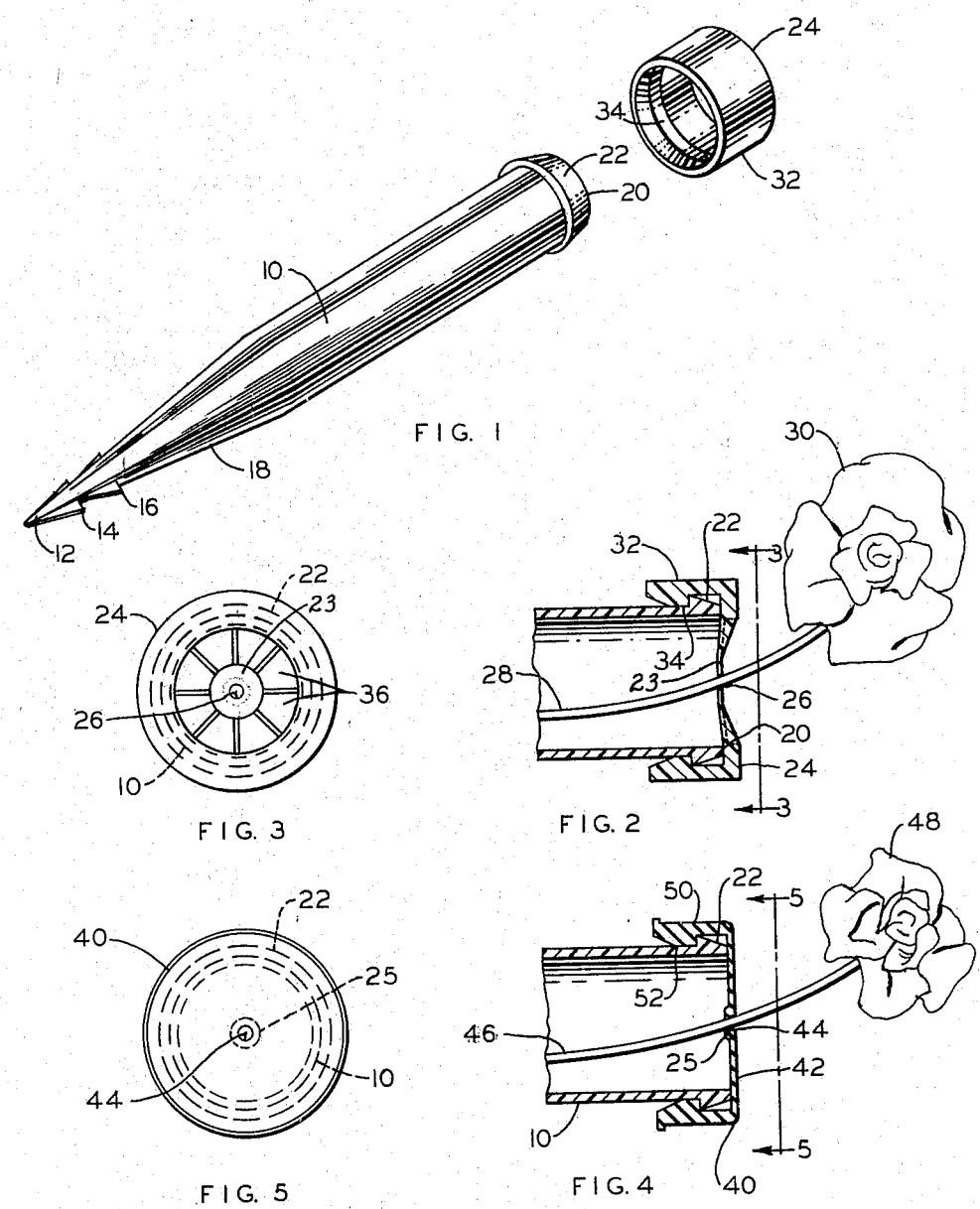
INVENTOR.
ELMER A. TURNER
BY Albert L. Jeffers
ATTORNEY

United States Patent Office 3,290,819
Patented Dec. 13, 1966

3,290,819
FLORAL MOUNTING MEMBER
Elmer A. Turner, New Haven, Ind., assignor to Wayne Plastics, Inc., Fort Wayne, Ind., a corporation of Indiana
Filed May 14, 1965, Ser. No. 455,850
1 Claim. (Cl. 47—41.1)

This invention relates to an improved floral mounting member, and more particularly to an improved floral mounting member which also serves as a container for water for the floral item.

It is one of the objects of the present invention to provide a floral container having an improved mounting means in the form of a serrated end which permits the container to be thrust into a mounting medium, such as styrofoam or the like, and then twisted so that the serrated end provides barbs for retaining and supporting the floral display.

It is a further object of the present invention to provide a new and improved closure for the open end of the floral display container which is easily but reliably locked with the open end so that water displaced by insertion of the flower stalk or stem will not dislodge the cover.

It is an important feature of the present invention that a resilient cover be provided which will snap fit over the open end of the tubular container which serves as a floral display container and is adapted to securely and reliably grip the open end, confining the water within the tubular container but providing for endwise insertion of the stem through a central opening of the cover without disrupting the mounting conection between the cover and the tubular container.

Other objects and features of the present invention will become apparent from a consideration of the following description which proceeds with reference to the accompanying drawing wherein:

FIGURE 1 is an isometric exploded view of the container and cover, the two parts being shown detached from each other;

FIGURE 2 is an enlarged fragmentary sectional view taken through the tube and cover after the two parts are assembled and showing a flower stem and flower inserted through the central opening of the cover or cap;

FIGURE 3 is an end view of the cover and tubular container looking in the direction of the arrows 3—3 in FIGURE 2;

FIGURE 4 is a sectional view similar to that of FIGURE 2 but of a further embodiment of the invention; and FIGURE 5 is an end view of the cap looking in the direction of the arrows 5—5 in FIGURE 4.

Referring now to the drawing, and particularly to the embodiment of FIGURES 1, 2 and 3, the floral container is designated generally by reference numeral 10 and is of tubular construction generally in the form of a transparent extrusion or molded polystyrene product. The particular material of construction is not critical to the invention; polystyrene is mentioned only by way of example as one suitable plastic material which can be used.

The container is of tubular construction so that when the stem is inserted endwise into the container it will be adequately immersed in the water of the container and will be sufficiently supported so that it will maintain an upright position. The tubular container 10 is generally filled with water to nourish the flower which is mounted therein. The container 10 is frequently mounted in a mounting medium (not shown) of styrofoam or the like and is arranged according to the design selected by the floral arranger. In order to position the container 10, there is provided a pointed serrated end 12 having dual serrations 14 and 16 and a tapered end 18. The pointed end 12 together with the taper 18 permits the container to pierce the styrofoam, and after the tubular container 10 is embedded sufficiently in the styrofoam, the tube is twisted slightly, and the serrations 14 and 16 resist withdrawal of the container 10, thereby securely mounting the container in place within the styrofoam or the like.

At the open end 20 of the tubular container is a tapered boss 22 which is formed integrally with the tubular container 10. There is fitted over the open end 20 a cover 24 formed with a central portion of reduced thickness 23 having a central opening 26 through which is received the stem 28 of floral item 30 which can be a rose or any other flower to be displayed. Surrounding the cover 24 is a resilient skirt 32 with an annular detent 34 which is press fitted over the tapered boss 22 and snaps into locking engagement with boss 22 at its undersurface (FIGURE 2).

When the stalk 28 is inserted endwise into the container 10 and displaces some of the water therein, the water will, instead of dislodging the locked connection between the cover 24 and end 20 of the container, simply distend the resilient cover pushing it outwardly from a flat configuration (FIGURE 2) to a convex shape. To facilitate this distension, there are a plurality of radial ribs 36 (FIGURE 3) which are circumferentially spaced, and these strengthen the cover at the central portion thereof while still permitting it to bulge slightly outwardly until the excess water is allowed to escape through the opening 26 in the spaces between the stem 28 and openings 26.

In order to remove the flower, after it is wilted and is to be discarded, or for any other reason, the stem 28 is simply pulled out of the opening 26, and the cover 24 can be removed from the end of the container 10 by peeling the skirt 32 away from the tapered boss 22, disconnecting the gripping connection between the detent 34 and the undersurface of boss 22.

The tubular container or water pick 10 is then removed from the styrofoam mounting by twisting the container 10 until the serrations 14 and 16 are realigned with their entry track into the styrofoam and are thus easily withdrawn.

Referring next to the embodiments of FIGURES 4 and 5, the cover 40 may be in the form of a natural or synthetic rubber. In this embodiment, the cover includes a flat disc 42 which extends over the open end of the tubular container 10 and has a central opening 44 for receiving the stem 46 of the floral item 48. Skirt 50 includes an annular tooth 52 which snap fits over the tapered boss 22 and resiliently locks against the undersurface of the tapered boss.

The resiliency of the cover 42 is sufficient to permit distension of the cover 42 when water is displaced from the interior of the tubular container as the stalk 46 is inserted endwise therein. The excess water will escape through the space provided between the stalk 46 and opening 44.

When it is desired to remove the cover, the resilient skirt 50 is peeled back disengaging the tooth 52 from the boss 22 and the cover is thereby removed.

In both embodiments, as the floral stalk is inserted into the tubular container, water which acts against the undersurface of the cover causing it to be distended tends to contract the annular detent 34 (FIGURE 2) and 52 (FIGURE 4) and draws it more tightly against the undersurface of the tapered boss 22 of the container, thereby insuring even tighter fit of the two parts. Consequently, the cover cannot be accidentally or inadvertently removed.

In either embodiment, when it is desired to discard the floral item, the cover can be readily removed by peeling it away from its connection with the end of the container 10.

In both embodiments the water within the container or water pick is confined so that the flower has a supply of water to preserve it in a fresh condition.

In both embodiments the tubular container can vary in color including green, white, blue, etc., and the caps or covers can be of either matching or of different colors, depending upon the design selected, and can also vary in composition, being either the same as or a different composition from the container cap.

Although the present invention is illustrated in connection with two example embodiments, it will be understood that these are illustrative of the invention and are by no means restrictive thereof.

It is reasonably to be expected that those skilled in this art can make numerous revisions and adaptations of the invention to suit individual design requirements, and it is intended that these revisions and adaptations will be included within the scope of the following claim as equivalents of the invention.

I claim:

A container for supporting and suspending flowers through the stalk thereof, comprising an elongated tubular vessel having a hollow interior adapted for receiving water or other liquid, means forming a plurality of integral serrations at the end of said container in proportion to effect piercing through a mounting material having strength suitable for supporting the said container and its contents, means forming an integral shoulder at the end of said tubular vessel and surrounding the open end of said tubular vessel, a single one-piece resilient cover proportioned to extend over said open end and having a skirt which is resiliently deformable to form a snap fitting with said integral shoulder, said resilient cover unperforated except for a central opening therein to receive the stalk which is passed therethrough and into said tubular vessel, a detent portion of said skirt defining a snap fitting combined with said shoulder at the open end of said tubular member to resiliently hold the cover and tubular vessel in assembled relation, and a plurality of radial ribs which are circumferentially spaced on said cover plate to define circumferential spaced portions of reduced thickness to permit distending of said cover by the displacement of water within the tubular vessel as the floral stalk is inserted therein through the opening in said cover, said ribs extending radially from a portion of reduced thickness adjacent said central opening.

References Cited by the Examiner

UNITED STATES PATENTS 2,908,112 10/1959 Koistinen _____ 47—41.11
3,177,617 4/1965 Koistinen _____ 47—41.11

FOREIGN PATENTS 1,169,932 1/1959 France.

ABRAHAM G. STONE, *Primary Examiner.*

JOE O. BOLT, JR., *Examiner.*

PASQUALE A. RAZZANO, *Assistant Examiner.*